Jan. 9, 1945.  D. LIPPOW  2,366,863
CYCLE LOCK
Filed Jan. 14, 1944
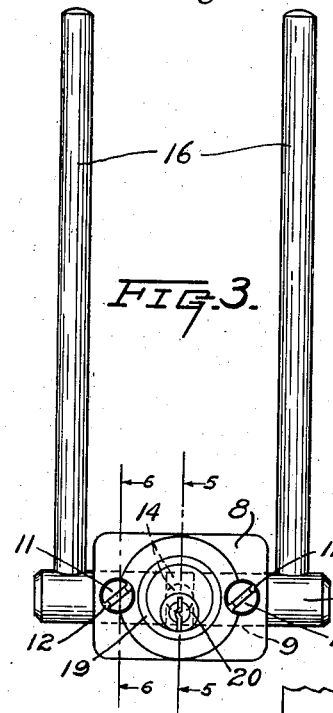
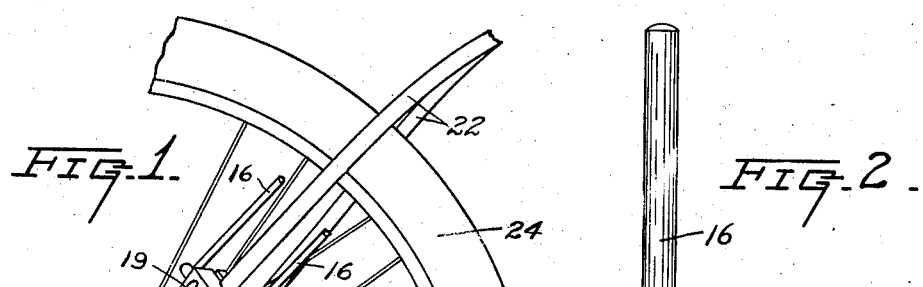
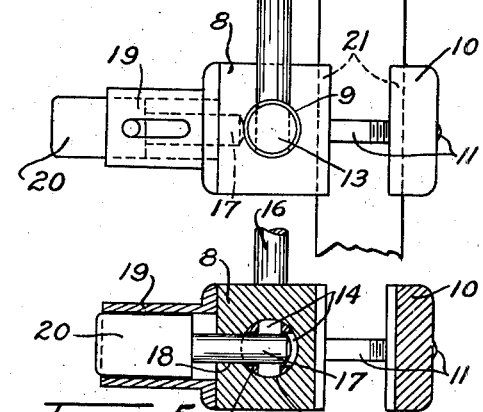
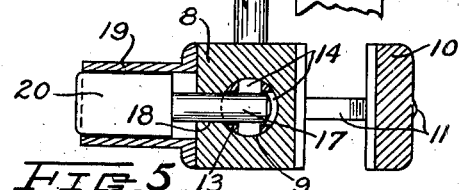
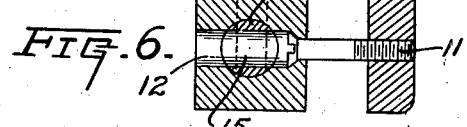
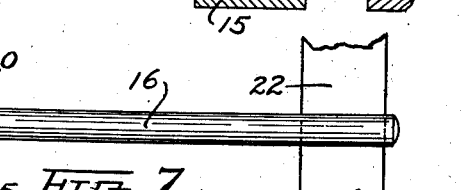
INVENTOR.
David Lippow
BY
Lieber & Lieber
ATTORNEYS.

Patented Jan. 9, 1945

2,366,863

UNITED STATES PATENT OFFICE 2,366,863

CYCLE LOCK

David Lippow, Milwaukee, Wis.

Application January 14, 1944, Serial No. 518,244

8 Claims. (Cl. 70—227)

The present invention relates in general to improvements in anti-theft devices, and relates more specifically to improvements in the construction and operation of locking assemblages for preventing the unauthorized use of bicycles, motor-cycles, and similar vehicles.

An object of the invention is to provide an improved cycle lock which is simple and compact in construction, and which is moreover highly effective in use.

Many different types of bicycle locks have heretofore been proposed and used with varying degrees of success, but practically all of these prior devices have proven objectionable for one reason or another. Perhaps the most common and effective of these prior cycle locking devices, is the padlock with extra long shackle adapted to coact with the spokes, forks, drive chains or other parts of a bicycle; but these padlocks are rather difficult to apply and to remove, and must be bodily removed when the vehicle is in use and are therefore frequently lost or mislaid. Ordinary padlocks cooperating with chains, and many special kinds of cycle locks, have also been used to some extent, but these have also proven highly objectionable either because they were too difficult to apply, or because they were too complicated and costly, or because they did not effectively serve their purpose and were obstructive to the occupant of the vehicle.

It is therefore a more specific object of my present invention to provide a new and useful cycle locking assemblage which obviates all of the above mentioned objectionable features, and which may be permanently attached to a bicycle or the like in an unobstructive manner so as to permit convenient manipulation thereof.

Another specific object of this invention is to provide an exceedingly simple but durable bicycle lock, which besides being efficient in use, may be manufactured at moderate cost.

A further specific object of my invention is to provide an improved cycle lock which is very compact in structure, and which can be quickly and effectively attached to a bicycle or the like so as to form a part of the vehicle, or just as quickly removed.

Still another specific object of the present invention is to provide an improved cycle lock assemblage of neat and pleasing appearance, which may be rapidly and conveniently shifted from released to locking position, and vice versa.

These and other objects and advantages of the invention will be apparent from the following detailed description.

A clear conception of the several features constituting my present improvement, and of the mode of applying and of utilizing cycle locks embodying the invention, may be had by referring to the drawing forming a part of this specification wherein like reference characters designate the same or similar parts in the various views.

Fig. 1 is a somewhat diagrammatic perspective view of a fragment of the rear wheel and frame fork of a cycle, showing one of my improved locking assemblages applied thereto;

Fig. 2 is an enlarged front or rear view of one of the improved cycle locks, showing the mechanism in released position;

Fig. 3 is a similarly enlarged side view of the assemblage of Fig. 2, showing the parts in the same released position;

Fig. 4 is a likewise enlarged front or rear view of the same locking assemblage, but showing the same in locking position;

Fig. 5 is a central vertical section through the cycle lock, taken along the line 5—5 of Fig. 3;

Fig. 6 is a vertical section taken along the line 6—6 of Fig. 3, and showing the mechanism in released position; and Fig. 7 is a section similar to that of Fig. 6, but showing the mechanism in locking position.

While the invention has been shown and described herein as having been applied to a cycle lock which is applied to the rear frame fork of a bicycle or the like, it is not my desire or intent to unnecessarily restrict the scope or utility of the improvement by virtue of this specific disclosure, and it is to be understood that the improved mechanism may be advantageously applied to other parts of cycles and other assemblages.

Referring to the drawing, the improved cycle locking mechanism shown therein, comprises in general a supporting member or block 8 having a through bore 9; a clamping member or plate 10 cooperable with the block 8; several screw threaded connecting elements or fastening screws 11 insertible through transverse holes 12 formed in the block 8 and uniting the members 8, 10; a pivot shaft 13 journalled for rotation or oscillation within the bore 9 of the block 8 and having therein intersecting central transverse openings 14 and parallel transverse openings 15 on opposite sides of the central openings 14 alineable with the holes 12, and also having opposite ends projecting beyond the ends of the bore 9; a pair of approximately parallel locking bars 16 radiating from the protruding opposite ends of the shaft 13; a push bolt 17 cooperable with a transverse bore 18 in the block 9 and being interchangeably or alternately cooperable with the two intersecting shaft openings 14; a cylindrical casing 19 secured to the block 8 in central alinement with the bore 18; and a show case type of pin tumbler locking cylinder 20 slidable within the casing 19 and being secured to the push bolt 17.

The members 8, 10 are preferably formed of durable metal and are provided with coacting grooves 21 adapted to coact as shown, with a cycle fork 22 or the like, and the casing 19 may be welded, brazed, or otherwise rigidly attached to the block member 8. The fastening elements or screws 11 have screw thread coaction with the plate member 10 and are provided with opposite slotted end heads having slightly smaller diameter than the holes 12 and shaft openings 15; and these holes 12 and the corresponding openings 15 are alineable so as to permit application or removal of the clamping screws with the aid of a screw driver, only when the locking bars 16 are in released position pointing either upwardly as in Figs. 1, 2 and 3, or downwardly in the opposite direction. When the bars 16 are in locking position as shown in Fig. 7, the slotted heads of the clamping screws 11 are sealed from access through the holes 12, thus positively preventing removal of the screws and of the locking assemblage.

The screws 11, pivot shaft 13 and the locking rods or bars 16 should be formed of hard material such as steel, and the bars 16 should be firmly attached to the protruding opposite ends of the shaft 13 so that the bars 16 will be disposed approximately radial with respect to the shaft axis and parallel to each other. One of the transverse through openings 14 at the center of the shaft 13 is disposed substantially parallel to bars 16, while the intersecting opening 14 is approximately perpendicular thereto. The show case type of lock is of old and well known construction wherein the cylinder lock or pin tumbler cylinder 20 must be pushed into the tubular slotted casing 19 in order to automatically place the bolt 17 in locking position, and in which the bolt 17 and cylinder 20 are automatically retracted or released when a key of proper shape is applied to the locking cylinder 20. When the cylinder 20 and bolt 17 are in retracted position as shown in Fig. 2, the shaft 13 is free to rotate relative to the block 8 within the bore 9; but when the cylinder 20 is pushed inwardly as in Figs. 4 and 5, the bolt 17 will enter and will be locked within the corresponding shaft opening 14, thus permitting locking of the bars 16 in either upright or horizontal position.

In order to apply the improved locking mechanism to a bicycle or other assemblage with which the mechanism is to be associated, it is only necessary to position the shaft 13 as illustrated in Figs. 5 and 6, so that the fastening screws 11 are accessible for screw driver manipulation. The block 8 and clamping plate 10 may then be positioned on opposite sides of one of the fork parts 22 as shown in Figs. 1, 2 and 4, so that the rods or bars 16 are free to swing between the cycle wheel spokes 23 within the rim and tire assembly 24 in order to span the space between the oppositely disposed fork parts 22, whereupon the screws 11 may be firmly applied to clamp the locking mechanism in position. The locking assemblage thus becomes an accessory permanently attached to the vehicle, and by manipulating the locking cylinder 20 manually in order to push this cylinder and the bolt 17 into locking position, or with the aid of a suitable key in order to effect automatic retraction of the cylinder 20 and bolt 17, the locking bars or rods 16 may be placed either in inactive position as shown in solid lines in Figs. 1, 2, 3, 5 and 6, or in active locking position as depicted in solid lines in Figs. 4 and 7, and in dot-and-dash lines in Fig. 1. The locking mechanism may however be just as readily removed upon withdrawal of the clamping screws 11, and does not obstruct free use of the vehicle when in inactive position.

From the foregoing detailed description it will be apparent that my present invention provides a simple, compact and durable cycle lock which can be quickly and conveniently applied to or removed from a cycle when in inactive position as when the cycle is released for normal use, but which provides a highly effective lock and cannot be removed without destruction when in active or locking position. The various parts of the mechanism can obviously be manufactured at low cost with simple tools, and the block and shaft assemblage coacting with a standard show case type of lock, provides extremely simple and strong means for retaining the bars or rods 16 in various positions of adjustment, and for preventing unauthorized use of the cycle to which the lock is attached. By rigidly attaching the locking assemblage to the vehicle, misplacement or loss of the lock is avoided, and the locking unit is normally out of the way and in no manner obstructs or interferes with the normal use of the vehicle. While the improved formation of the shaft 13 with through openings 15 alineable with the screw insertion holes 12 of the block 8 permits quick attachment or removal of the unit, this formation also positively prevents removal of the lock assemblage when the vehicle is locked against propulsion, and in actual practice the block 8 and plate 10 should be formed so as to normally expose as little of the medial portions of the screws 11 as possible. Although the locking mechanism as shown, embodies two parallel locking bars 16, only one such bar is necessary, and the improved cycle locking assemblage has proven highly satisfactory and successful for cycle locking purposes but may also be advantageously employed for diverse other purposes. The locking unit obviously presents a neat and attractive appearance, and may be applied to either fork or to other parts of a cycle or similar structure.

It should be understood that it is not desired to limit this invention to the exact details of construction or to the precise mode of use or application, herein shown and described, for various modifications within the scope of the appended claims may occur to persons skilled in the art.

I claim:

1. In combination, a supporting member, clamping means for attaching said member to a support, a pivot shaft journalled in said member and having therein intersecting transverse holes, a locking bar radiating from each end of said shaft, and a push bolt alternately cooperable with said shaft holes to lock said bars in several different radial positions of adjustment relative to the shaft axis.

2. In combination, a supporting block having a through bore, means for attaching said block to a support, a pivot shaft journalled in said bore and having intersecting medial transverse openings and ends projecting beyond the opposite ends of said block, locking bars radiating from the projecting ends of said shaft, and a bolt alternately cooperable with said shaft openings to lock said bars in different positions relative to the shaft axis.

3. In combination, a supporting member having a bore and a hole extending transversely of said bore, a pivot shaft journalled in said bore and having a transverse through opening alineable with said hole, a fastening element for effecting attachment of said member to a support and being insertible and removable and manipulable through said hole and opening only when in alined position, locking means radiating from said shaft, and a bolt cooperable with said shaft to lock said means in different positions of adjustment relative to the shaft axis.

4. In combination, a supporting block, a pivot shaft journalled in said block, means for clamping said block to a support laterally of said shaft, locking bars radiating from the opposite ends of said shaft, said shaft having several radial openings formed in a medial portion thereof, a bolt alternately movable into said openings to lock said bars in different positions radially of the shaft axis, and a reciprocable lock cylinder for locking said bolt within said openings.

5. In combination, a supporting block, a pivot shaft journalled in said block and having several transverse openings in the medial portion thereof, a clamping screw manipulable through one of said openings to fasten said block to a support, a locking bolt insertible in several others of said openings to lock said shaft in different positions of adjustment, said screw being accessible for manipulation in only one of said positions, and a reciprocable locking cylinder for holding said bolt within said openings.

6. In combination, a supporting block, a pivot shaft journalled in said block and having several transverse openings in the medial portion thereof, a clamping screw manipulable through one of said openings to fasten said block to a support, a locking bolt insertible in several others of said openings to lock said shaft in different positions of adjustment, said screw being accessible for manipulation in only one of said positions, locking bars radiating from the opposite ends of said shaft and being swingable thereby, and a reciprocable locking cylinder for holding said bolt within said openings.

7. In combination, a supporting block, a clamping plate cooperable with said block, a pivot shaft extending through said block and having through openings directed toward said plate and also being provided with intersecting openings, locking bars radiating from the ends of said shaft, screws insertible and manipulable through said through openings to connect said block and plate, and a bolt cooperable with said intersecting openings to lock said shaft and bars in different positions of adjustment.

8. In combination, a supporting block, a clamping plate cooperable with said block, a pivot shaft extending through said block and having through openings directed toward said plate and also being provided with intersecting openings, locking bars radiating from the ends of said shaft, screws insertible and manipulable through said through openings to connect said block and plate, and a bolt cooperable with said intersecting openings to lock said shaft and bars in different positions of adjustment, said screws being accessible only when said shaft is in a predetermined position with said bars inactive.

DAVID LIPPOW.